(12) United States Patent
Harrison et al.

(10) Patent No.: US 7,014,387 B2
(45) Date of Patent: Mar. 21, 2006

(54) SHAFT DRIVE COUPLING

(75) Inventors: James Robert Harrison, Unley Park (AU); David William Miller, Henley Beach (AU)

(73) Assignee: FF Seeley Nominees PTY Ltd., (AU)

( * ) Notice: Subject to any disclaimer, the term of this patent is extended or adjusted under 35 U.S.C. 154(b) by 0 days.

(21) Appl. No.: 10/144,617

(22) Filed: May 13, 2002

(65) Prior Publication Data
US 2002/0192022 A1 Dec. 19, 2002

(30) Foreign Application Priority Data
May 11, 2001 (AU) .................... PR5070
Dec. 3, 2001 (AU) .................... PR9252

(51) Int. Cl.
*B25G 3/36* (2006.01)
(52) U.S. Cl. .................. 403/371; 403/403; 403/368; 411/339
(58) Field of Classification Search ............... 403/265, 403/367, 368, 370, 371; 411/339, 354, 514, 411/395, 417, 419, 425, 272–274, 238; 16/2.1, 16/2.4, 2.5
See application file for complete search history.

(56) References Cited

U.S. PATENT DOCUMENTS

| | | | | |
|---|---|---|---|---|
| 1,124,707 A | * | 1/1915 | Cowan | 403/368 |
| 2,151,831 A | * | 3/1939 | Buccicone | 403/370 |
| 2,273,102 A | * | 2/1942 | Harris et al. | 403/373 |
| 2,504,087 A | * | 4/1950 | Ougljesa | 411/551 |
| 2,881,652 A | * | 4/1959 | Swaim | 411/419 |
| 3,351,966 A | * | 11/1967 | Pelochino | 470/14 |
| 3,625,633 A | * | 12/1971 | Nelson | 416/169 R |
| 4,094,352 A | * | 6/1978 | Hlinsky | 411/185 |
| 4,339,218 A | * | 7/1982 | Navarre | 411/419 |
| 4,345,851 A | * | 8/1982 | Soussloff | 403/369 |
| 4,623,277 A | * | 11/1986 | Wayne et al. | 403/314 |
| 4,628,602 A | * | 12/1986 | Koltermann | 30/261 |
| 4,668,119 A | * | 5/1987 | Galletti | 403/349 |
| 4,944,562 A | | 7/1990 | Garrison | 301/111 |
| 5,517,878 A | * | 5/1996 | Klein et al. | 74/551.3 |
| 5,588,329 A | * | 12/1996 | Nedachi | 74/473.36 |
| 5,632,568 A | * | 5/1997 | Fechter | 403/328 |
| 6,095,713 A | * | 8/2000 | Doyle et al. | 403/97 |
| 6,280,133 B1 | * | 8/2001 | Haberle | 411/392 |
| 6,332,734 B1 | * | 12/2001 | Hebert | 403/371 |
| 6,439,817 B1 | * | 8/2002 | Reed | 411/110 |
| 2002/0159828 A1 | * | 10/2002 | Rotshtain | |

FOREIGN PATENT DOCUMENTS

DE 3242926 A1 * 5/1984
DE 34 44 608 A1 * 6/1986 ............. 403/370

* cited by examiner

Primary Examiner—Robert J. Sandy
Assistant Examiner—Andre L. Jackson
(74) Attorney, Agent, or Firm—Watts Hoffmann Co, LPA

(57) ABSTRACT

A single piece coupling device for connecting a load component to a rotatable shaft. The device comprises a sleeve having a bore for containing a rotatable shaft, an externally threaded portion and a tapered engagement face on the outer surface of the sleeve. Radial compression relief associated with the tapered engagement face is provided such that when the device is fitted on a shaft, and as the threaded portion engages with a corresponding threaded region on the load component, the tapered engagement face engages the load component and the compression relief enables the sleeve to be radially compressed to grip the shaft.

5 Claims, 6 Drawing Sheets

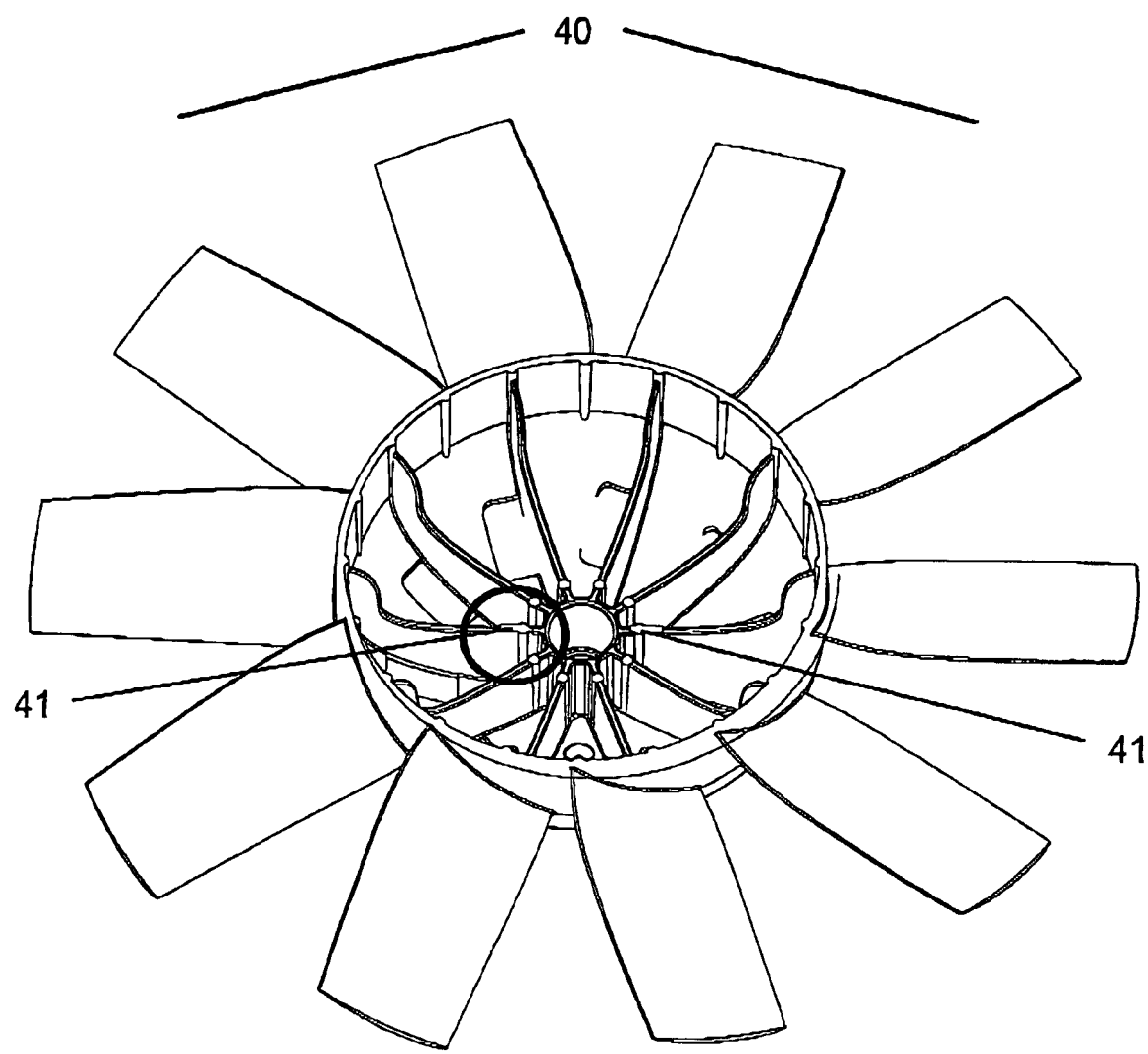
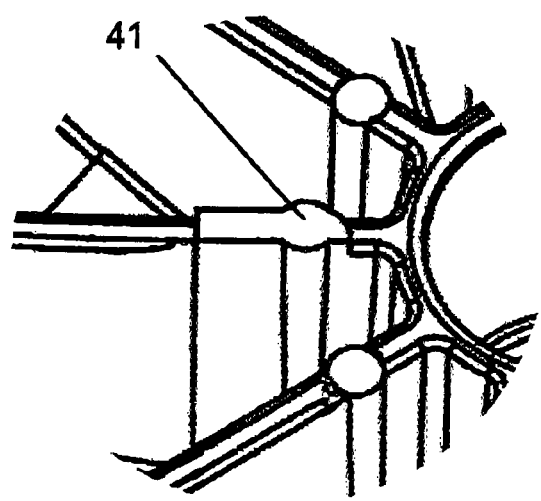
Fig. 6
Fig. 6a

SHAFT DRIVE COUPLING

FIELD OF THE INVENTION

This invention relates to a drive coupling for the connection of a load device to a rotating shaft while allowing for the ready disconnection of the load device.

DESCRIPTION OF THE PRIOR ART

Throughout this description and the claims which follow, unless the context requires otherwise, the word "comprise", or variations such as "comprises" or "comprising", will be understood to imply the inclusion of a stated integer or step or group of integers or steps.

The reference to any prior art in this specification is not, and should not be taken as, an acknowledgement or any form of suggestion that that prior art forms part of the common general knowledge in Australia.

The requirement to connect a driven device to a shaft providing motive power is a situation arising in many appliances and industrial applications. The shaft providing motive power will generally be the output shaft of an electric motor, but may be another intermediate driven shaft as will be the case in many industrial applications. The nature of the driven device can vary widely. The device may be a fan or pump to be connected to a motor shaft. Another familiar application is the connection of a wheel to a hub shaft as in automotive applications. In industrial applications, the coupling device may be required as an intermediate part in a complex drive train and may simply connect a driven shaft to a driving shaft.

Many devices have been developed over time to fulfil this function. U.S. Pat. No. 4,338,036 describes a tapered bushing and hub assembly, in which a tapered, split bush is inserted in a tapered bore. Threaded fasteners force the bushing inwardly to the tapered bore.

U.S. Pat. No. 4,944,562 describes an adapter for a wire wheel hub as used on an automobile. In this instance, the wheel is secured to the adapter by a separate spinning nut to the threaded hub, with torque transmitted through splines formed on the hub.

SUMMARY OF THE INVENTION

In accordance with one aspect, the present invention provides a single piece coupling device for connecting a load component to a rotatable shaft, said device comprising a sleeve having a bore for containing a rotatable shaft, an externally threaded portion and a tapered engagement face on the outer surface of the sleeve, radial compression relief means associated with the tapered engagement face, such that when the device is fitted on a shaft and as the threaded portion engages with a corresponding threaded region on the load component the tapered engagement face engages the load component and the compression relief means enables the sleeve to be radially compressed to grip the shaft.

In a preferred form the coupling device comprises an engagement projection within the bore of the sleeve adapted to mate with a complementary recess on a shaft to be gripped by the device. The projection functions to restrain relative longitudinal displacement between the device and a shaft when mounted on the shaft.

In a further preferred form the bore of the sleeve of the coupling device is shaped to transmit torque when fitted on a shaft.

Preferably, the compression relief means is formed by at least one longitudinal slotted region in the sleeve wall adjacent the tapered engagement face.

It has been discovered that when a device in accordance with the broadest aspect of this invention is used in applications in which one or both of the components of the sleeve or the load component are thermally cycled, that it is possible for the action of the engaged threaded portions with the tapered engagement face to become progressively tighter with each complete cycle of heating and cooling of a component. Each cycle of temperature thereby results in an increase in load on the components, and an increase in stress in the parts of the components subjected to this load. If this thermal and operational cycling is allowed to continue, then eventually one of the components of the thread engagement between the sleeve and load components will fail due to excessive stress, these components being subjected to the highest stress during operation.

The eventual failure of the threaded portions of the sleeve or load component can be prevented if the progressive movement of the threaded portions is limited to a degree whereby the stresses in the material of either component does not exceed the maximum allowable working stress recommended by the material manufacturer.

If the component parts of the sleeve and load component are normally manufactured using an injection moulding process from polymer material, the geometric relationships between the respective components when in threaded engagement will always be the same. These geometric relationships are determined by the geometry of the injection moulding tools used in their manufacture, and hence each individual part manufactured will be identical. The repeatability of manufacture of components presents an opportunity to fix the allowable extent of movement of the threaded engagement of the respective components by arranging for a physical constraint to prevent movement beyond which maximum allowable stresses in the material would be exceeded.

This further aspect provides a mechanism whereby the progressive movement of the threaded portions is limited to the extent that maximum allowable stresses are not exceeded.

BRIEF DESCRIPTION OF THE DRAWINGS

The present invention will now be described by way of example with reference to the accompanying drawings, in which:—

FIG. 6 is a perspective view of a load component, in the form of a fan, incorporating additional projections that have been added to provide for engagement with the modified flange portions of the sleeve of the coupling device of FIG. 5.

DESCRIPTION OF EMBODIMENTS

Figure 1:
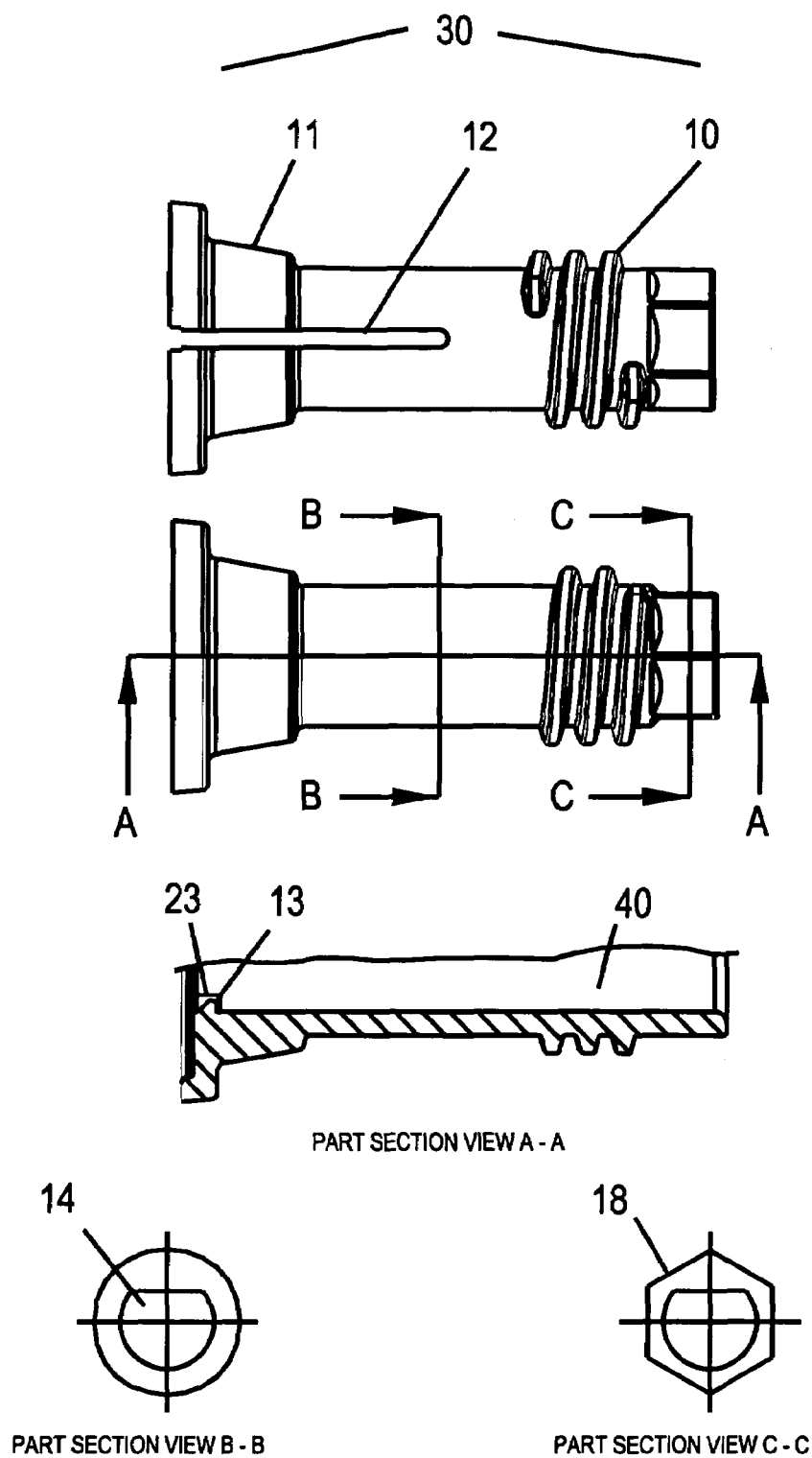
FIG. 1 is a series of plan and sectioned views of a shaft drive coupling in accordance with an embodiment of the present invention.

FIG. 1 shows a shaft drive coupling device 30 which is adapted to be fitted over a driving shaft 40 (partly shown in section A—A). The shaft drive coupling of this embodiment comprises a single component which has the features of a coarse, fast lead male thread 10, a tapered engagement 11, slotted relief 12, a "D" shaped bore 14 and an engagement projection 13. The male thread 10 may be left or right handed according to the direction of rotation of the driving and driven devices.

Figure 2:
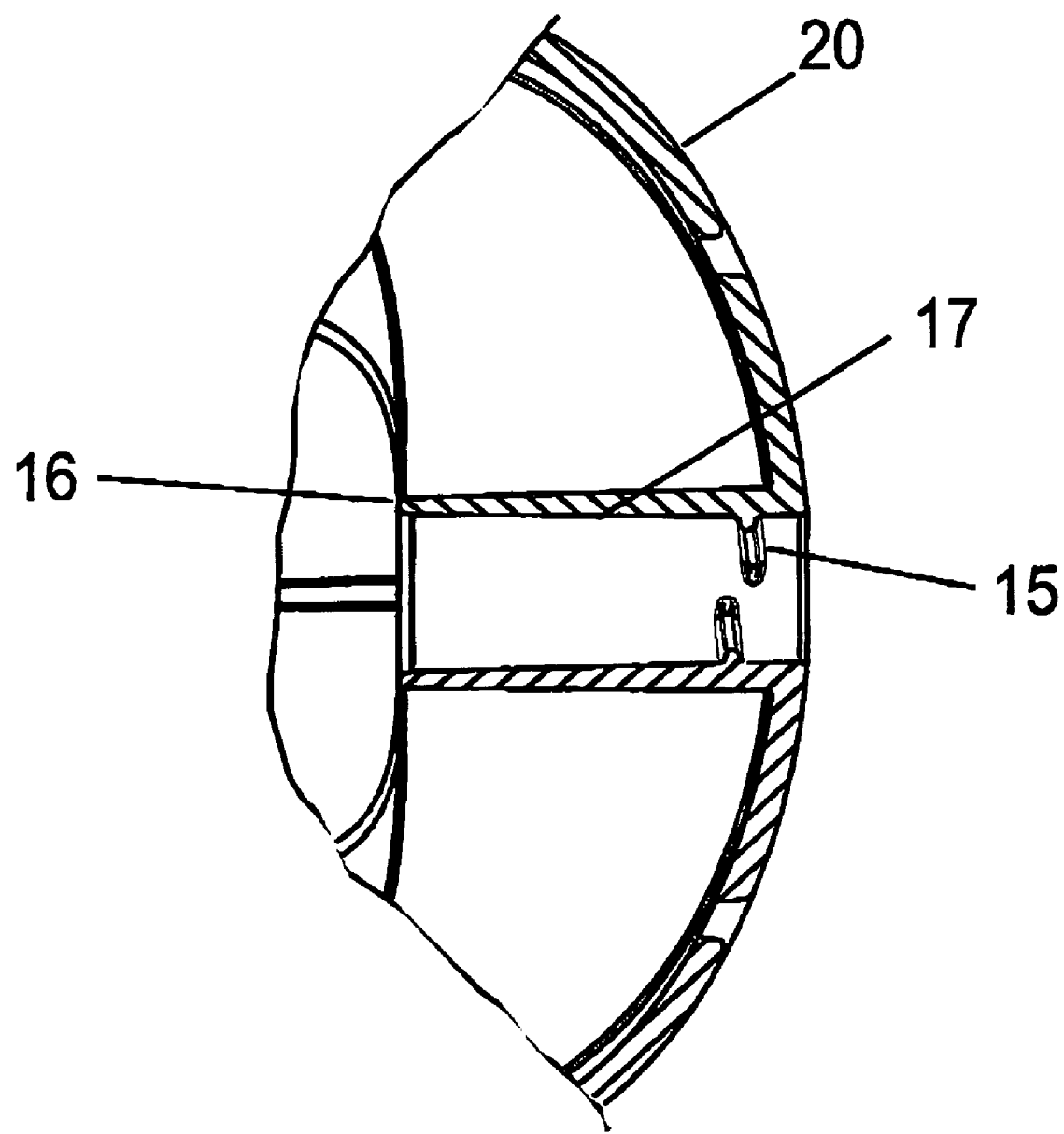
FIG. 2 is a longitudinal section view of an embodiment of an engagement part of a load device to be fitted by the coupling of FIG. 1.
Figure 3:
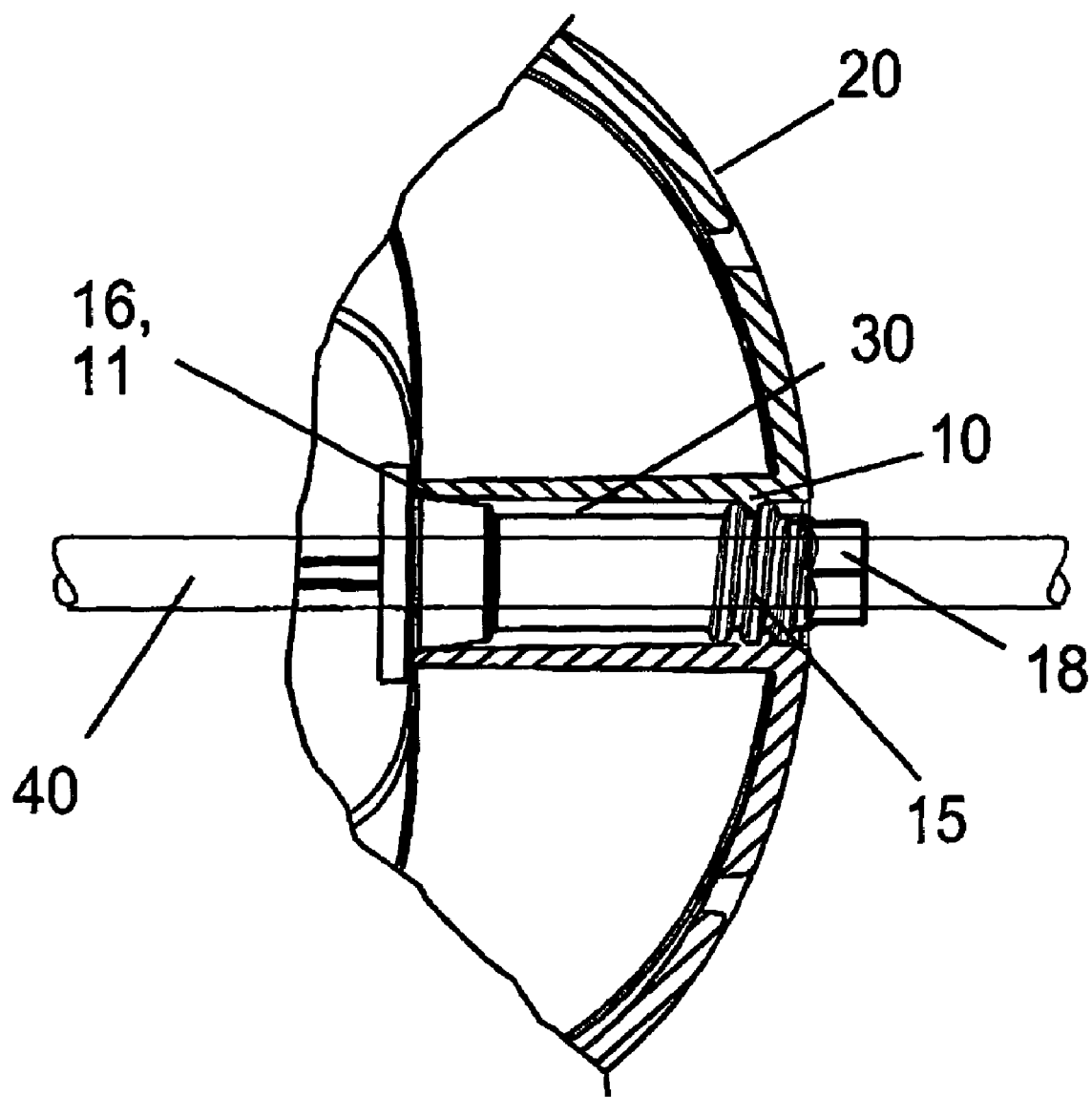
FIG. 3 is the view of FIG. 2 showing engagement of the load device on the shaft drive coupling of FIG. 1.
Figure 4:
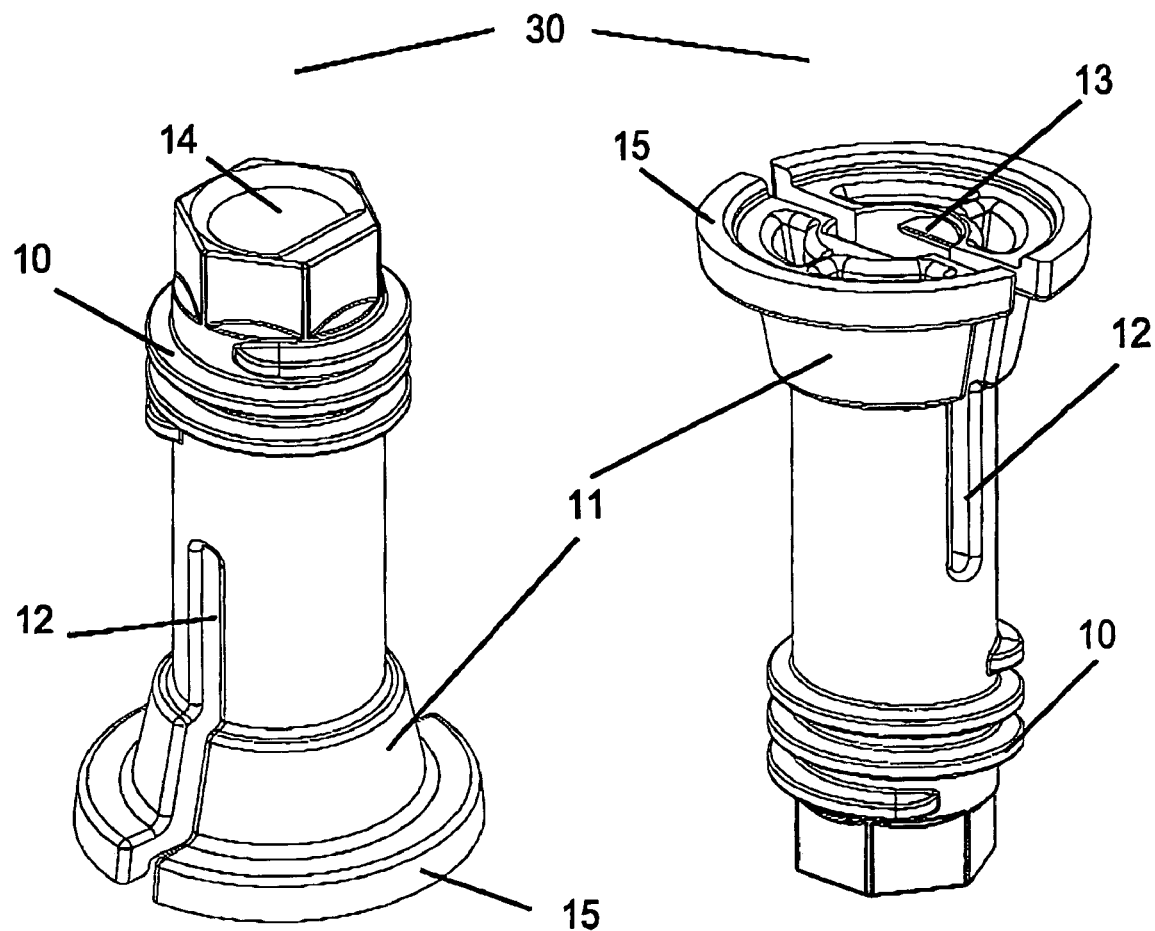
FIG. 4 an isometric perspective of another embodiment of a sleeve of the coupling device in accordance with the first aspect of the present invention.

FIG. 2 shows a part section of driven device 20. The features on the driven device required for operation of the shaft drive coupling are a formed female thread 15 within the bore 17, and an engagement face 16. FIG. 3 shows the shaft drive coupling 30 with the driven device 20 in the normal operating position. In this position, the female thread 15 of the driven device is engaged fully with the male thread 10 of the shaft drive coupling 30, while simultaneously the engagement face 16 of the driven load device 20 is frictionally engaged with the tapered engagement face 11 of the shaft drive coupling 30.

The shaft drive coupling 30 is preferably manufactured as a single component, such as by plastic injection moulding, although other manufacturing techniques such as machining from solid, or metal casting could be used. The shaft drive coupling 30 is preferably fitted to a driving shaft 40 which has had a flat machined on the surface, making a section of the shaft appear as a "D" shape, shown as 14 in Section B—B of FIG. 1. The interference of the "D" shaped shaft on the bore of the drive shaft coupling provides the necessary torque resistance to drive the driven load device. It will be appreciated by those skilled in the art that the outside diameter of the shaft and corresponding bore of the shaft drive coupling could have many shapes which provide the necessary torque resistance without detracting from the operation of embodiments of the invention. One such shape could, for example, be longitudinal splines on both the shaft and coupling.

In operation, the shaft drive coupling 30 is slid along a driving shaft 40, after correct alignment of the "D" shape interference in the preferred embodiment. The coupling is engaged on the shaft 40 until the projection 13 on the bore of the drive shaft coupling shown in Section A—A of FIG. 1 engages with a corresponding recess 23 in the driving shaft 40. The slots 12 in the drive shaft coupling enable that end of the coupling to readily flex open while the coupling is slipped along the shaft, thereby allowing the projection 13 to be deflected away from the shaft until the projection 13 is adjacent to the corresponding shaft recess 23.

The load device 20 is then slipped over the shaft drive coupling until the female thread form 15 of the load device engages on the male thread form 10 of the shaft drive coupling. The load device 20 is then rotated in a direction in which the engaging threads drive the driven device to a position where the engagement taper 11 of the drive shaft coupling engages the engagement face 16 of the load device. Further relative rotation of the load device 20 on the shaft coupling causes additional loading on the tapered engagement of face 11 with face 16, with consequent squeezing of the shaft coupling bore towards the driving shaft. The slots 12 in the shaft drive coupling in the vicinity of tapered face 11 allow the bore of the shaft coupling to be readily crushed towards the driving shaft, thereby firmly engaging the "D" shape and ensuring drive torque resistance. Furthermore, the crush of the drive shaft coupling onto the driving shaft ensures that the projection 13 engaged in a corresponding recess 23 on the shaft cannot disengage, thus resisting any possible longitudinal movement of the drive shaft coupling along the shaft.

In the preferred embodiment, the female thread 15 formed within the load device is formed with less than 360 degrees of thread, such as to allow the thread to be formed as part of an injection moulding which can be removed from the moulding tool without the need to unscrew the thread.

When the drive is started, the rotational inertia of the driven device results in further tightening of the threaded engagement, and hence further locking of the coupling to the driving shaft. Since starting torque for most driven loads is generally much larger than the torque in the opposite direction when the drive is turned off, the overall tendency of the shaft coupling and load combination is to keep the engaged threads 10, 15 tight. By careful selection of the pitch of the engaging threads and the angle of the tapered face 11, the mechanism will lock tight on the first starting of the drive and have no tendency to disengage while slowing down.

A practical example of the application of an embodiment of the invention is in the fitting of an axial flow fan to the shaft of an electric motor in this application, the shaft of the motor is machined with a flat along the shaft, and the recess 23 or a dimple located at a suitable position on the shaft. The drive shaft coupling is slipped over the driving shaft until the projection 13 engaged in the recess 23 on the shaft. The fan, corresponding to load device 20 in FIGS. 2 and 3, is then slipped over the shaft coupling, and rotated until the tapered face of the shaft coupling engaged on the engaging face, corresponding to face 16 in FIGS. 2 and 3, of the fan. In operation, the motor only turns in one direction, such direction keeping the threaded engagement of the fan on the coupling constantly tight. The shaft coupling keeps the drive tight without any free clearance, accurately centres the fan hub, transmits all the required torque and power, and can be readily disassembled for maintenance and repair.

For removal of the driven device from the shaft coupling, a hexagon shape 18 is provided on the end of the drive shaft coupling as shown in Section C—C of FIG. 1. To remove the load, a conventional spanner is applied to the hexagon end 18 of the shaft coupling while restraining the load device or the driven shaft. The threaded engagement is then readily released, and the entire mechanism removed from the shaft.

Figure 5:
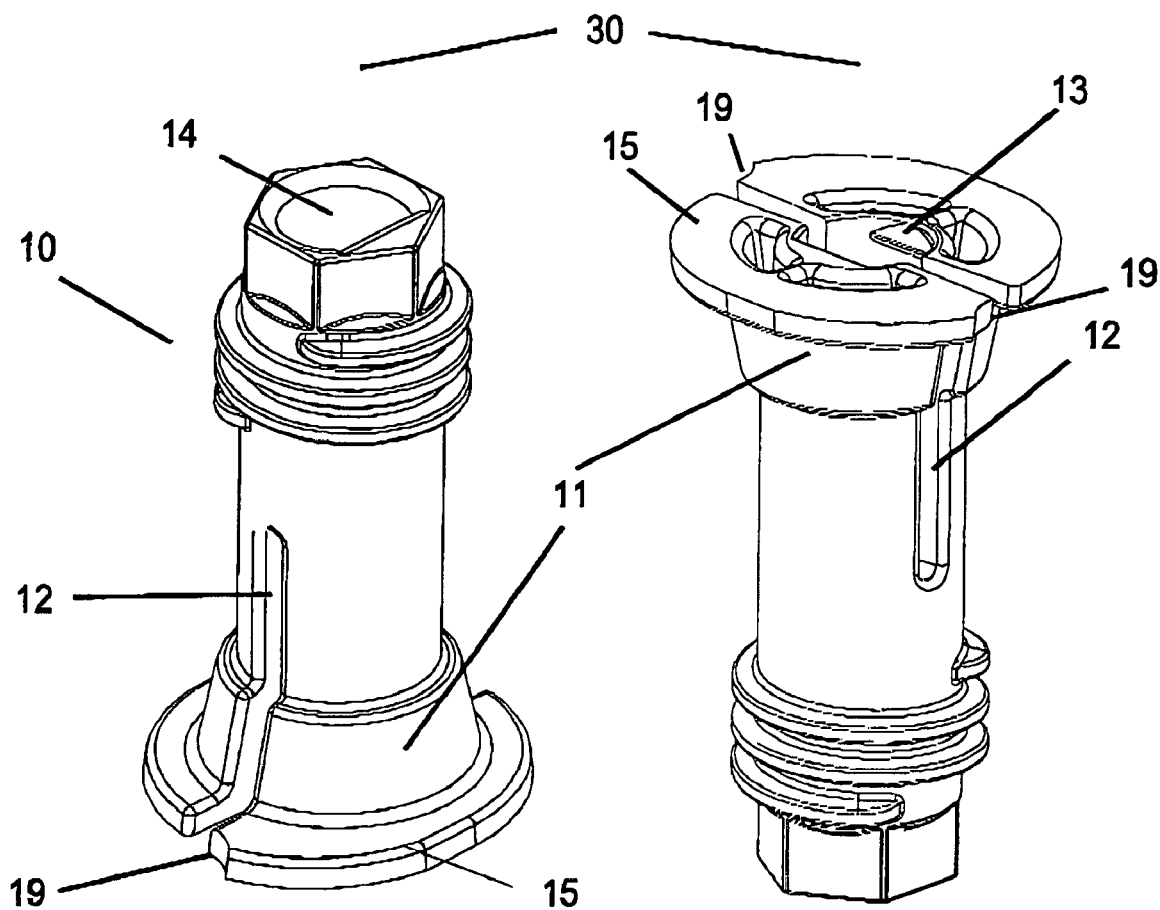
FIG. 5 is an isometric view of a modified form of the embodiment of FIG. 4 incorporating projections that have been added to provide engagement of the modified flange portions of the sleeve of the coupling device of FIG. 4.

FIG. 5 shows a shaft drive coupling device with a modified flange detail. The flange 15 has been modified from the form as shown in the embodiment of FIGS. 1–3 and 4 by the addition of radial projections 19 which extend beyond the original boundary of the flange, and which are of such a shape as to provide for ready engagement onto a corresponding projection on the load device.

FIG. 6 shows a typical load device 40. In the case of this illustration the load device is an injection moulded polymer fan. The internal detail of the load device moulding has raised projections 41 shown enlarged at inset FIG. 6a. The positions of raised projections 41 are such that when the projections 19 on the shaft drive coupling device engage on projections 41, any further thread engagement movement between the thread 10 of the device 30 and the threaded portion of load device 40 is prevented. By analysis and experiment, the actual positions of projections 41 and projections 19 are arranged such that the restrained engagement position illustrated in FIG. 6 does not allow for stresses in either of the components of the shaft drive coupling device 30 or the load device 40 to exceed the maximum allowable stresses.

The shape of the projections on the shaft drive coupling device 30 and the load device 40 are arranged such that further movement of the thread engagement between the devices is restrained, without resulting in excessive stresses generated at or as a result of the engagement of the projections.

The embodiment of FIGS. 5 and 6 provides an inexpensive and effective means of restraining the threaded engagement of a shaft coupling device and a load component in such a way as to prevent stressing of components beyond maximum allowable stresses.

The present invention provides an inexpensive and effective means of coupling a driving shaft to a driven load in a single component, which is self locking once installed, yet can be readily removed using simple tools.

The invention claimed is:

1. A single piece coupling device for connecting a load component to a rotatable shaft, said device comprising
   1) a sleeve having a bore, said bore includes at least one flat surface wherein the flat surface engages a complimentary surface on the shaft,
   2) the sleeve having an outer surface including an externally threaded portion and a tapered engagement face;
   3) a radial compression relief means associated with the tapered engagement face, such that when the device is fitted on a rotatable shaft and as the threaded portion engages with a corresponding threaded region on a load component, the tapered engagement face engages the load component and the compression relief means enables the sleeve to be radially compressed to grip the rotatable shaft;
   4) an engagement projection within the bore of the sleeve adapted to mate with a complementary recess on a rotatable shaft to be gripped by the device to restrain relative longitudinal displacement between the device and the rotatable shaft when mounted on the rotatable shaft; and
   5) wherein said load component is a fan.

2. A single piece coupling device for connecting a load component to a rotatable shaft, said device comprising
   1) a sleeve having a bore, said bore includes a least one flat surface wherein the flat surface engages a complimentary surface on the shaft,
   2) the sleeve having an outer surface including an externally threaded portion and a spaced tapered engagement face;
   3) a radial compression relief means associated with the tapered engagement face and spaced axially from the threaded portion, such that when the device is fitted on a rotatable shaft and as the threaded portion engages with a corresponding threaded region on a load component, the tapered engagement face engages the load component and the compression relief means enables a portion of the sleeve spaced from the threaded portion to be radially compressed to grip the rotatable shaft; and
   4) wherein said load component is a fan.

3. A single piece coupling device for connecting a load component to a rotatable shaft, said device comprising
   1) a sleeve having a bore, said bore being shaped to transmit torque between the bore and at least a portion of the rotatable shaft wherein the outer peripheral of the bore is smooth and includes at least one flat surface wherein the flat surface engages a complementary surface on the shaft,
   2) the sleeve having an outer surface including an externally threaded portion and a spaced tapered engagement face; and,
   3) a radial compression relief associated with the tapered engagement face and spaced axially from the threaded portion, such that when the device is fitted on a rotatable shaft and as the threaded portion engages with a corresponding threaded region on a load component, the tapered engagement face engages the load component and the compression relief means enables a portion of the sleeve spaced from the threaded portion to be radially compressed to grip the rotatable shaft.

4. The device of claim 3 further comprising an engagement projection within the bore of the sleeve adapted to mate with a complementary recess on a rotatable shaft to be gripped by the device to restrain relative longitudinal displacement between the device and the rotatable shaft when mounted on the rotatable shaft.

5. The device of claim 3 wherein said load component is a fan element.

* * * * *